US009121529B2

(12) United States Patent
Machado et al.

(10) Patent No.: US 9,121,529 B2
(45) Date of Patent: Sep. 1, 2015

(54) METHOD OF LAYING A HYBRID PIPELINE ON THE SEABED

(75) Inventors: Jessica da Silva Machado, Rio de Janeiro (BR); Peter Tanscheit, Rio de Janerio (BR); Frederico Nicoletti De Fraga, Rio de Janeiro (BR); Paulo Marcio Moreira Castro, Rio de Janerio (BR)

(73) Assignee: Subsea 7 Limited, Sutton (GB)

( * ) Notice: Subject to any disclaimer, the term of this patent is extended or adjusted under 35 U.S.C. 154(b) by 204 days.

(21) Appl. No.: 13/578,559

(22) PCT Filed: Feb. 10, 2011

(86) PCT No.: PCT/EP2011/051954
§ 371 (c)(1),
(2), (4) Date: Feb. 19, 2013

(87) PCT Pub. No.: WO2011/098517
PCT Pub. Date: Aug. 18, 2011

(65) Prior Publication Data
US 2013/0164084 A1      Jun. 27, 2013

(30) Foreign Application Priority Data

Feb. 12, 2010   (GB) .................................. 1002441.2

(51) Int. Cl.
*F16L 1/26*    (2006.01)
*F16L 1/16*    (2006.01)
(Continued)

(52) U.S. Cl.
CPC ... *F16L 1/26* (2013.01); *F16L 1/16* (2013.01); *F16L 1/166* (2013.01)

(58) Field of Classification Search
CPC ............... F16L 1/235; F16L 1/12; F16L 1/18; F16L 1/202; F16L 1/166; F16L 1/161; F16L 1/165; B63B 35/03; B63B 21/66; B63B 21/26; E21B 17/015; E21B 17/01; E21B 19/22; H02G 1/10; H02G 9/02; H02G 15/14
USPC ........... 405/158, 164, 166, 168.1, 168.2, 169, 405/170, 172, 173
See application file for complete search history.

(56) References Cited

U.S. PATENT DOCUMENTS 2,739,828 A * 3/1956 Schindler et al. ........ 285/148.12
3,520,358 A * 7/1970 Brooks et al. ................. 166/356
(Continued)

FOREIGN PATENT DOCUMENTS

WO     WO 91/15694      10/1991

OTHER PUBLICATIONS

ANSI/API Specification 17J, "Specification for Unbonded Flexible Pipe," American Petroleum Institute (3d ed. Jul. 2008).

Primary Examiner — Benjamin Fiorello
Assistant Examiner — Edwin Toledo-Duran
(74) Attorney, Agent, or Firm — Levy & Grandinetti

(57) ABSTRACT

A rigid-to-flexible connector (RFC) is provided on the rigid pipe section instead of a pipeline end termination (PLET), and the pipe end having the RFC is raised to the surface of the sea, while leaving a portion of the rigid pipe section on the seabed. The RFC is then connected to one end of the flexible pipe section, and the latter lowered to the seabed, with the raised, end of the rigid pipe section attached, to return the rigid pipe section to the seabed. Since the RFC on the rigid pipe section is connected to the flexible pipe section at the surface of the sea, the RFC can have a simpler, lighter, technical design, resulting in significant cost, manufacturing time and quality control time savings.

19 Claims, 17 Drawing Sheets

(51) Int. Cl.
*F16L 1/19* (2006.01)
*F16L 1/225* (2006.01)

(56) References Cited

U.S. PATENT DOCUMENTS

| | | | | |
|---|---|---|---|---|
| 3,751,932 A * | 8/1973 | Matthews, Jr. | | 405/173 |
| 3,777,499 A * | 12/1973 | Matthews, Jr. | | 405/173 |
| 3,795,115 A * | 3/1974 | Bergquist et al. | | 405/170 |
| 4,041,719 A * | 8/1977 | Baugh | | 405/169 |
| 4,120,171 A * | 10/1978 | Chateau et al. | | 405/169 |
| 4,448,568 A * | 5/1984 | Gentry et al. | | 405/168.3 |
| 4,906,137 A * | 3/1990 | Maloberti et al. | | 405/224.3 |
| 5,269,629 A * | 12/1993 | Langner | | 405/195.1 |
| 5,421,674 A * | 6/1995 | Maloberti et al. | | 405/166 |
| 5,501,549 A * | 3/1996 | Breda et al. | | 405/169 |
| 5,615,977 A * | 4/1997 | Moses et al. | | 405/195.1 |
| 5,639,187 A * | 6/1997 | Mungall et al. | | 405/195.1 |
| 5,687,793 A * | 11/1997 | Reimert et al. | | 166/342 |
| 5,921,713 A * | 7/1999 | Gjessing et al. | | 405/170 |
| 5,944,448 A * | 8/1999 | Williams | | 405/169 |
| 6,004,071 A * | 12/1999 | Broeder et al. | | 405/166 |
| 6,234,717 B1 * | 5/2001 | Corbetta | | 405/170 |
| 6,352,388 B1 * | 3/2002 | Seguin | | 405/166 |
| 6,361,250 B1 * | 3/2002 | de Varax | | 405/158 |
| 6,524,030 B1 * | 2/2003 | Giovannini et al. | | 405/166 |
| 6,739,804 B1 * | 5/2004 | Haun | | 405/195.1 |
| 6,767,165 B1 * | 7/2004 | Corbetta | | 405/170 |
| 6,869,253 B2 * | 3/2005 | Biolley | | 405/224.3 |
| 7,182,550 B2 * | 2/2007 | Renkema | | 405/173 |
| 7,614,593 B2 | 11/2009 | McClure et al. | | |
| 7,628,568 B2 * | 12/2009 | Critsinelis | | 405/169 |
| 7,861,982 B1 | 1/2011 | McClure | | |
| 8,007,203 B2 * | 8/2011 | Espinasse et al. | | 405/172 |
| 8,696,245 B2 * | 4/2014 | Clark et al. | | 405/156 |
| 2007/0177944 A1 * | 8/2007 | Smith et al. | | 405/169 |
| 2008/0253842 A1 * | 10/2008 | Wolbers et al. | | 405/169 |
| 2008/0309077 A1 * | 12/2008 | Espinasse et al. | | 285/259 |
| 2009/0324339 A1 * | 12/2009 | Roodenburg et al. | | 405/166 |

* cited by examiner

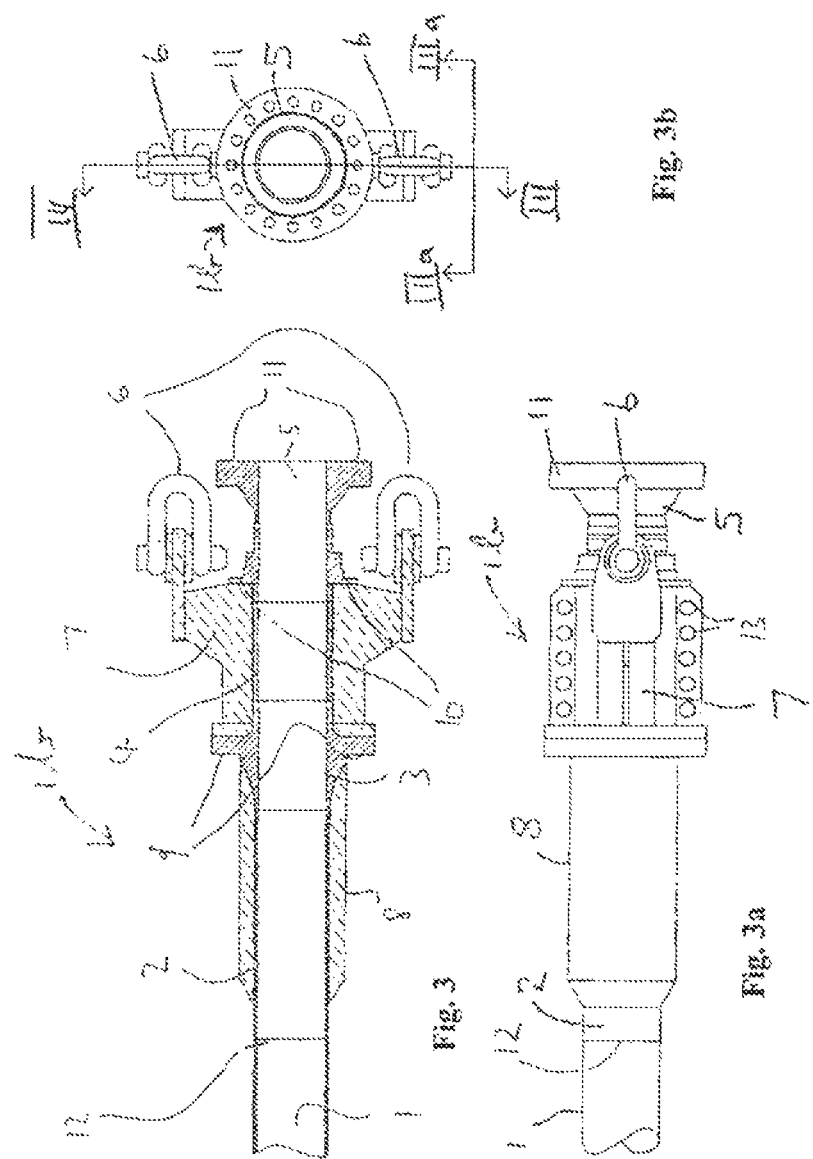

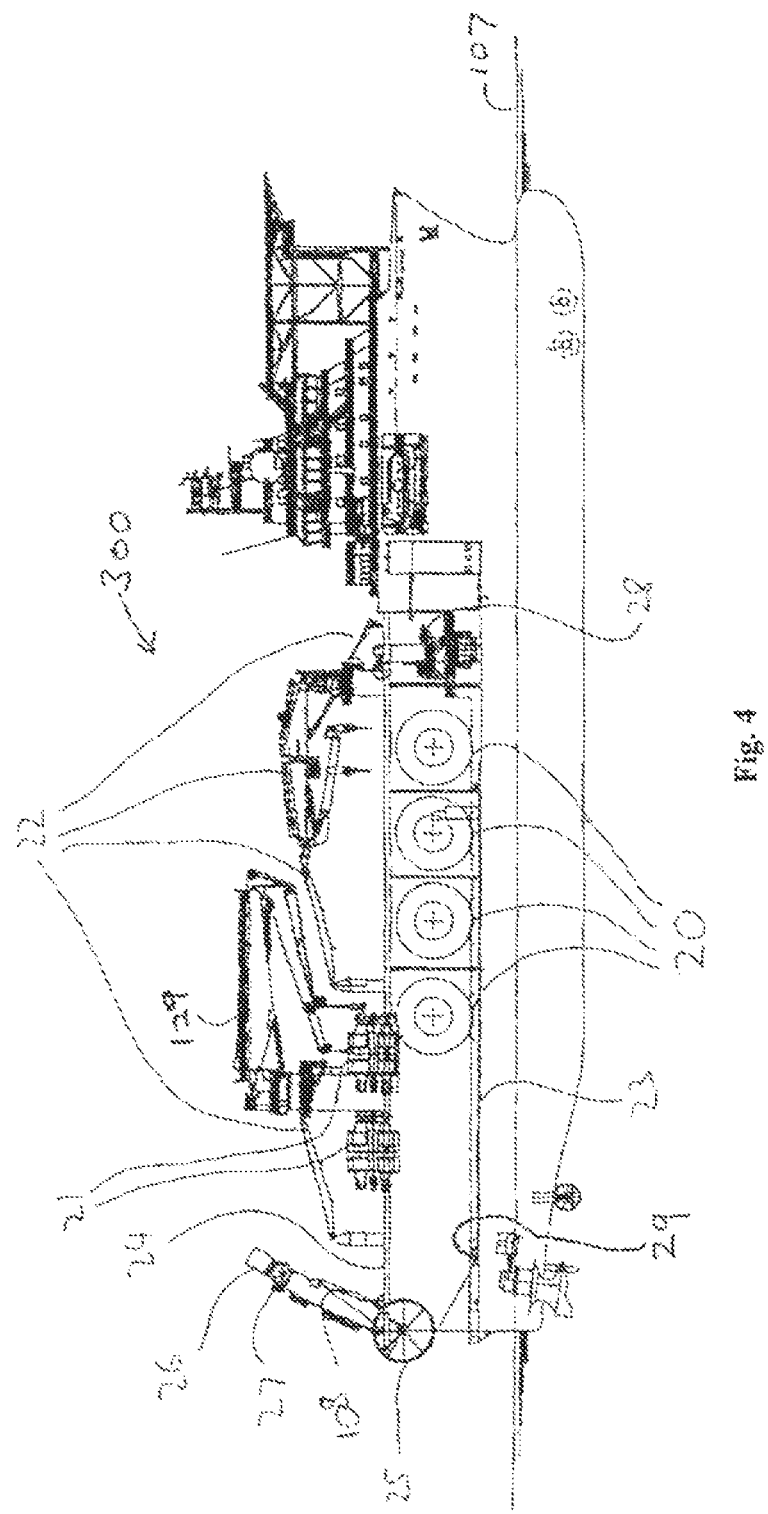

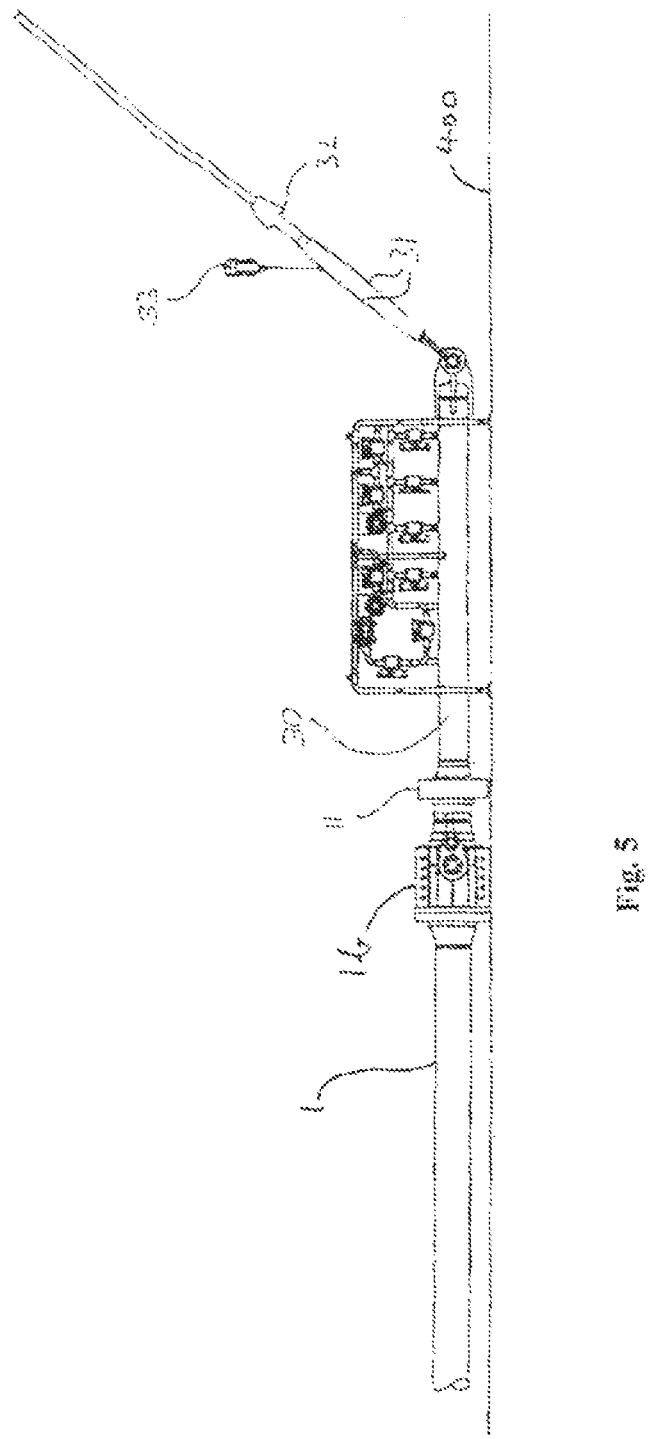

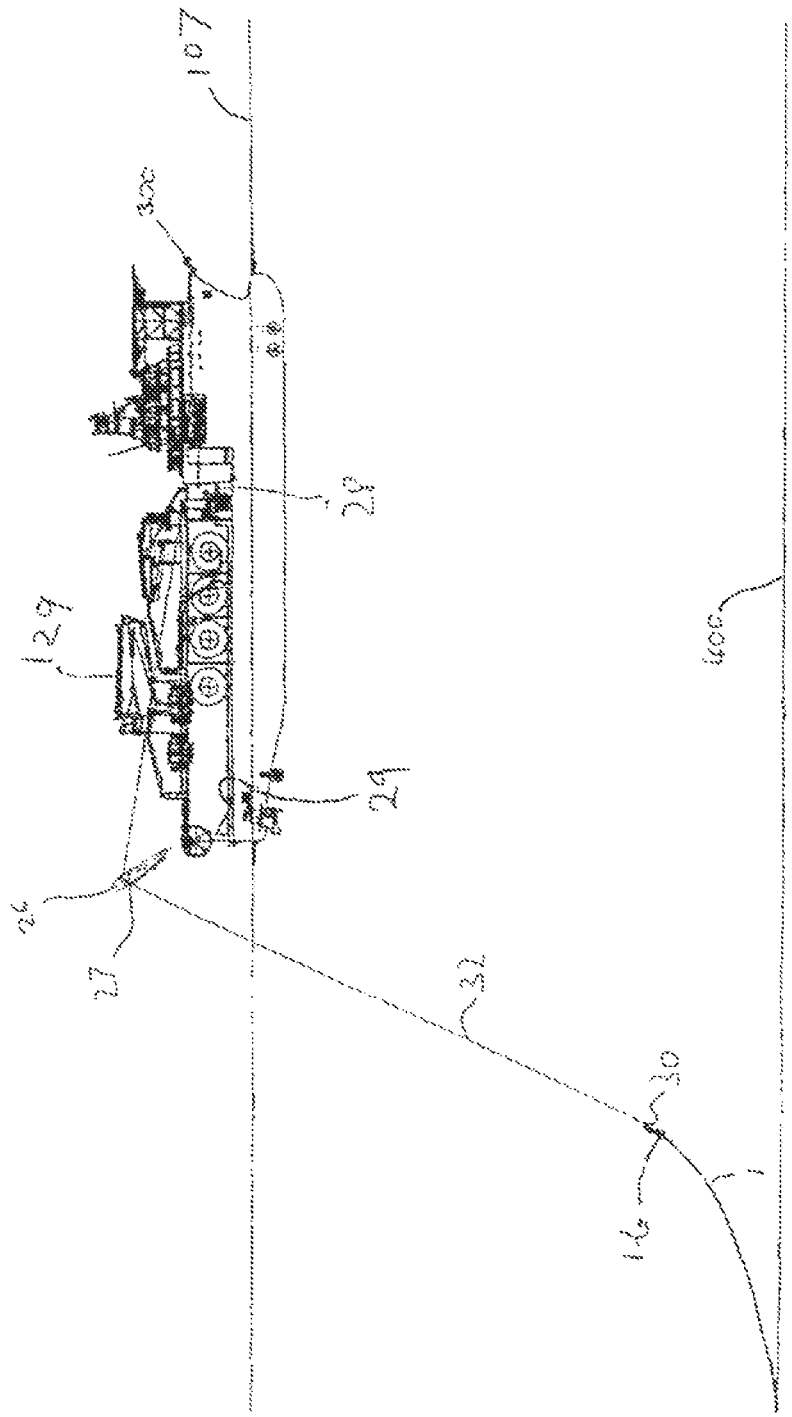

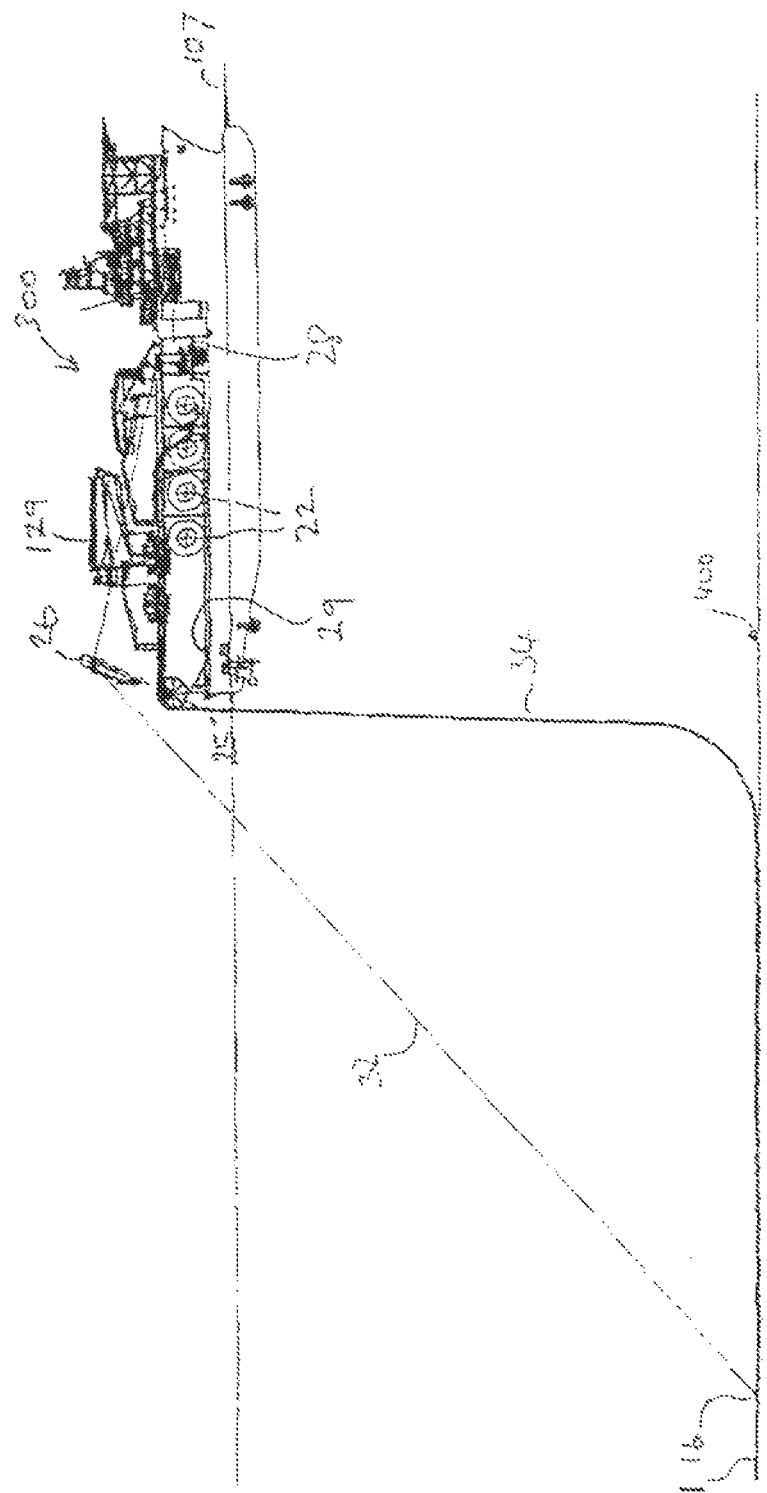

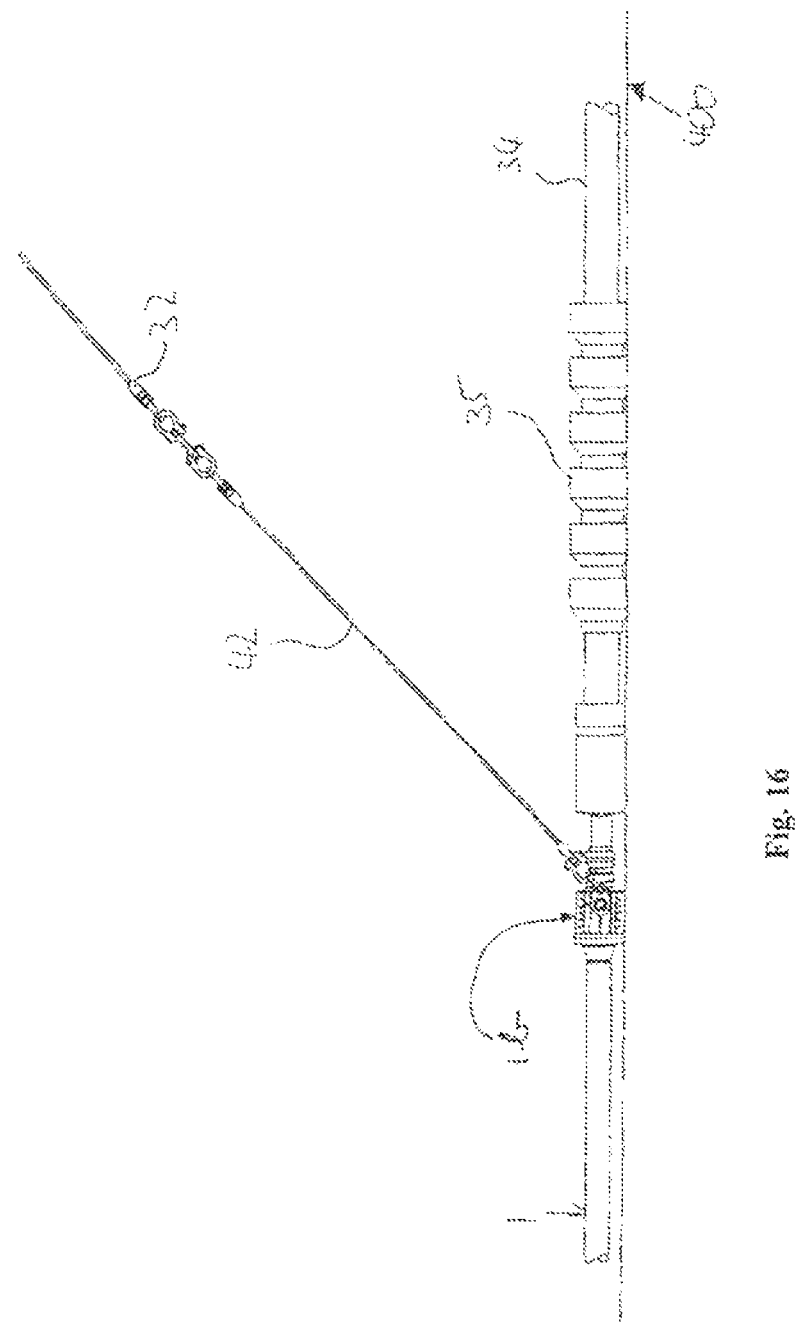

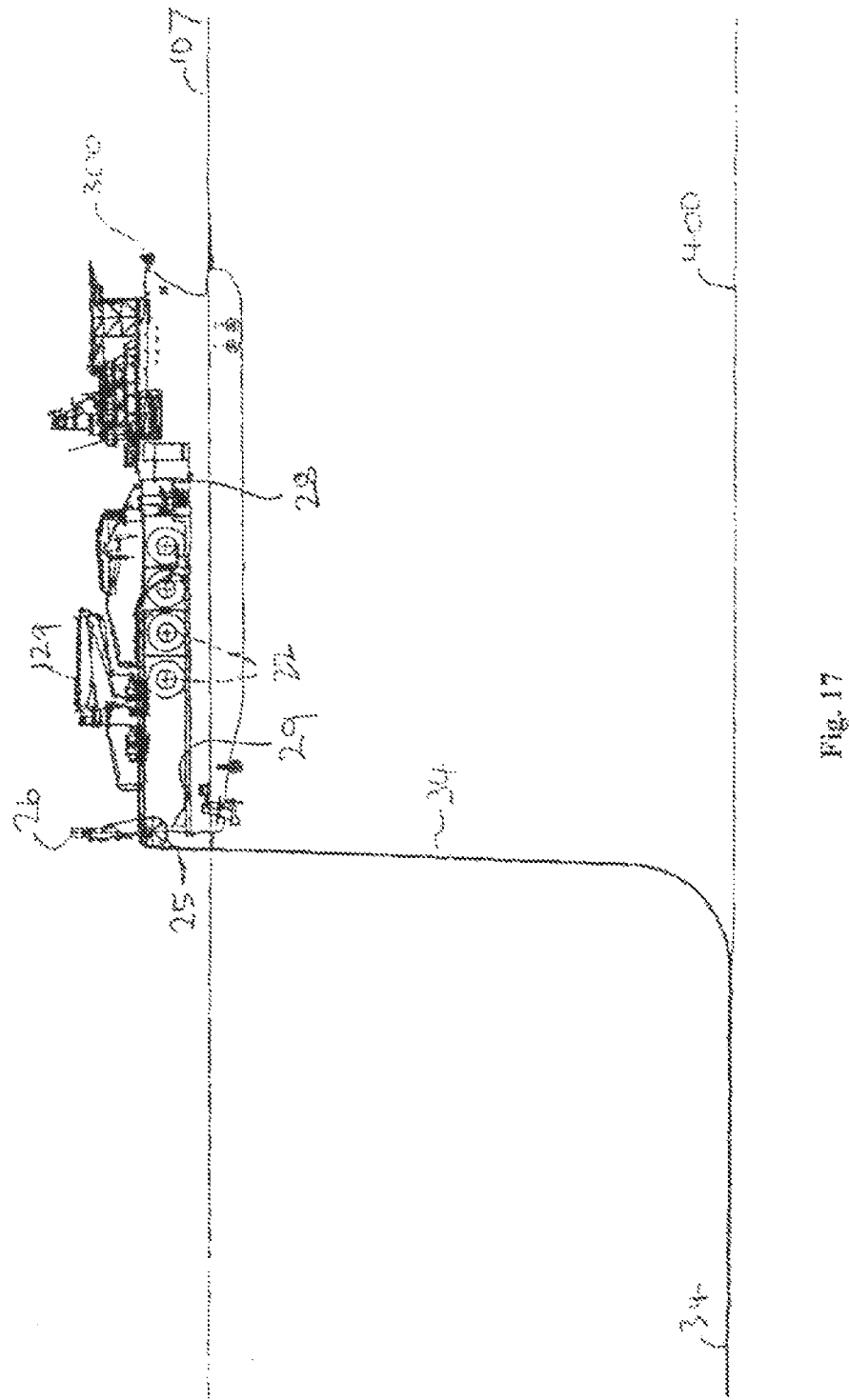

METHOD OF LAYING A HYBRID PIPELINE ON THE SEABED

This application is the U.S. National Phase of International Application Number PCT/EP2011/051954 filed on Feb. 10, 2011, which claims priority to Great Britain Application No. 1002441.2 filed on Feb. 12, 2010.

This invention relates to a method of laying a hybrid pipeline, and more particularly a pipeline comprising a rigid pipe section that lies on the seabed and a flexible pipe section which is connected to the rigid pipe section. The flexible pipe section can, for example, extend from one end of the rigid pipe section up to a location at the surface of the sea, or can connect the rigid pipe section to a manifold/Xmas tree at the wellhead, or both.

It is known in the oil industry to provide and install such a hybrid pipeline, for example for conveying oil or other hydrocarbon fluid from a wellhead on the seabed to a surface or floating production or storage facility at sea. FIG. 1 of the accompanying drawings shows a hybrid pipeline of this kind. As shown, the hybrid pipeline comprises a rigid pipe section 1 on the seabed 400, having a pipeline end termination (PLET) 102a, 102b at each end, a flexible jumper 105 connecting the end of the rigid pipe section at which the PLET 102a is located to a manifold/Xmas tree 106 provided at the wellhead of a subsea well, and a flexible pipe section or riser 34, connecting the end of the rigid pipe section at which the PLET 102b is located to floating production, storage, and offloading facility (FPSO) 103 at the surface 107 of the sea. The hybrid pipeline serves to convey production hydrocarbon fluid from the wellhead up to the FPSO floating on the sea surface. The hybrid pipeline installation is installed in the following manner.

Initially, a first kind of lay vessel (not shown), referred to herein as a rigid lay vessel, is used for lowering the section of rigid pipe 1, down through the body of sea water and onto the sea bed. Three main types of rigid lay vessel are known, (i) reel lay, (ii) J-lay and (iii) S-lay.

Typically, the former type of rigid lay vessel incorporates, in succession along the lay path on the vessel, an overboarding pipe guide, a pipe straightener and a tensioner, all on an inclined or vertical lay ramp. The tensioner draws a continuous length of rigid pipe from a storage drum for a continuous length of rigid pipe on the rigid lay vessel, over the overboarding guide and through the straightener to remove plastic deformations or sets in the pipe. Both J-lay and S-lay vessels use a welding station to weld a new straight length of rigid pipe, end-to-end, to a preceding straight pipe length, lower the pipe string thus formed until its upper end is in position at the welding station, and then repeat the process for further straight pipe lengths in turn. In all three cases, the pipe is then directed down into the water and to the seabed, as the lay vessel advances on the surface of the sea, thereby progressively depositing the deployed pipe on the seabed.

Ordinarily, a PLET will be provided on the end of the rigid pipe section that is to be laid first on the seabed from the rigid lay vessel. In this way, the PLET 102a is directed to, and positioned on, the seabed at its required location, followed by most of the rigid pipe section 1. Then, the rigid pipe is cut at the rigid lay vessel at its required final length and a second PLET is attached to the cut end of the pipe, which is then lowered from the rigid lay vessel onto the seabed using an abandonment and recovery (A & R) line.

The next step in the installation procedure is to lay, in either order, the flexible jumper 105 on the sea bed, between the manifold/Xmas tree 106 at the wellhead and PLET 102a on the rigid pipe section 1, and the flexible riser 34 down to the seabed, adjacent to PLET 102b, from the sea surface, retaining its other end at the sea surface. The flexible jumper and flexible riser are typically deployed from the sea surface, one at a time, using a different kind of lay vessel from the rigid lay vessel, specifically one adapted for laying flexible pipes. Such a lay vessel is similar in many respects to a rigid, reel lay vessel and it employs the same principal elements as described above, except that it does not include a pipe straightener because the flexible pipe straightens itself of its own accord, when it is drawn off the overboarding pipe guide and through the tensioner. The lay vessel employed is referred to herein as a flexible lay vessel.

After the flexible lay vessel has laid the flexible jumper on the seabed and one end of the flexible pipe down to the seabed, subsea connections are made to connect the flexible jumper between the wellhead manifold/Xmas tree and PLET 102a on the rigid pipe section 1 and between the other PLET 102b on the rigid pipe section and flexible riser 34, to complete the hybrid riser pipeline. These connections are made subsea using a remotely operated vehicle (ROV) or a diver.

The flexible lay vessel hands the upper end of the riser 34 over to the FPSO 103, which is in attendance alongside, and the riser is connected, by means of its end termination, to the storage or production facilities on the FPSO 103. The flex lay vessel departs the FPSO 103, to commence its next flexible pipe laying operation at a different site.

At typical working depths (a few meters to about 2,500 meters), the three subsea connections (two for the flexible jumper 105 and one for the flexible riser 34) can be made by the attendant ROV or diver without undue difficulty or delay. However, the two PLETs on the rigid pipe section need to be provided with special mechanical end connectors to enable them to be connected to the flexible jumper 105 and flexible riser 34, respectively, in a subsea environment. Furthermore, they are each provided with a mud mat or similar foundation, by means of which they sit on the seabed (which can be relatively soft), in order to distribute the load and prevent the PLETs from sinking into the seabed. Still further, each PLET, being a relatively sizeable device, is typically provided with a suitable guard to protect it from damage due to inadvertent impact from anchors or other dropped objects, or from being snared in fish trawling nets.

Each PLET, with its mechanical end connector, mud mat and anchor guard is a relatively large, heavy and intricate structure, making it expensive to manufacture and relatively time-consuming to deploy and connect up.

Clearly, a need exists for a hybrid pipeline for conveying hydrocarbon fluids from a subsea wellhead on the seabed to a surface facility, in which manufacturing and inspection costs and manufacturing time associated with the PLETs can be reduced, and the risk of impact and ensnarement damage minimised in an effective manner.

According to the invention there is provided a method of laying a hybrid pipeline comprising a rigid pipe section that lies on the seabed and a flexible pipe section which is connected to the rigid pipe section, comprising the steps of:
 (i) lowering a rigid pipe section onto the seabed,
 (ii) raising one end of the rigid pipe section on the seabed to the surface of the sea, while leaving a portion of the rigid pipe section on the seabed,
 (iii) connecting one end of a flexible pipe section to the raised end of the rigid pipe section, and
 (iv) lowering the one end of the flexible pipe section to the seabed with the raised end of the rigid pipe section attached, to return the latter to the seabed.

Since the rigid-to-flexible connections are made at the sea surface, the connectors (RFCs) used can be of simpler technical design than PLETs, which reduces their bulk, manufacturing cost and manufacturing time. Furthermore, they do not need anchor guards to provide protection from impact by anchors and other dropped objects, since they are smaller and typically less prone to damage than PLET-like structures.

In addition, trawling nets will tend to "skip" over an RFC, but are more likely to snare with a PLET, due to its greater size and more intricate external geometry. However, if there are significant concerns related to dropped objects, or over entanglement with trawling or fishing gear, RFCs can readily be buried in the same seabed trench that is formed optionally to accommodate the pipeline.

It should also be noted that installing PLETs will require ROV interventions from a much more technically sophisticated vehicle than the one required for RFCs.

Additionally, owing to their lesser bulk, mud mats or similar foundations are not required to spread the load on soft seabed formations, or at least can be made smaller than for the heavier PLETS.

Yet another benefit of an RFC is that when using an anchor wire, in known manner per se, to pull down a PLET to the seabed during deployment of the rigid pipe section, a stress reliever would need to be fitted between the PLET and rigid pipe end, to avoid stress-induced fatigue in metal of the pipe wall. When an RFC is used instead, a stress reliever may not be required, since the RFC is lighter, and therefore less likely to induce fatigue during deployment of the rigid pipe section. It will be appreciated that the advantages referred to above will be achieved, even if the connection at one end only of the rigid pipe section to a flexible pipe section is effected in the stated manner, or if only one end of the rigid pipe section is required to be connected to a flexible pipe section.

In one preferred way of putting the pipelaying method in to effect, the other end of the flexible pipe section is retained at the surface of the sea when the one end of the flexible pipe section is lowered to the seabed with the raised end of the rigid pipe section attached. In this way, the flexible pipe section serves as a riser section, such as may be used for bringing hydrocarbon production fluids flowing in the rigid pipe section up to the surface of the sea. Accordingly, the other end of the flexible pipe section retained at the surface of the sea when its one end is lowered to the seabed with the raised end of the rigid pipe section attached may be connected to a production or storage facility, which may be a floating facility.

Alternatively, the flexible pipe section may be a flexible jumper, which is laid on the seabed when the one end of the flexible pipe section is lowered to the seabed with the raised end of the rigid pipe section attached. Then, if the other end of the flexible jumper is connected to a manifold/Xmas tree at the wellhead of a subsea well, after the flexible jumper has been laid on the seabed, the rigid pipe section can be supplied with production fluids from the wellhead.

It is also possible for the rigid pipe section to have one end of a respective flexible pipe section connected to each of its ends. The two flexible pipe sections can be, respectively, a flexible jumper and a flexible riser, the other end of flexible riser being retained at the surface of the sea when the one end of the flexible riser is lowered to the seabed with the raised end of the rigid pipe section attached, and also being suitably connected to a production or storage facility, which may be a floating facility, as disclosed above, and the flexible jumper being laid on the seabed, when the one end of the flexible jumper is lowered to the seabed with the raised end of the rigid pipe section attached and, in one implementation of the pipe-laying method, having its other end connected to a manifold/Xmas tree at the wellhead of a subsea well, after the flexible jumper has been laid on the seabed. The resulting hybrid pipeline can serve for conveying production fluids from the wellhead and up to the surface of the sea, for handling on an offshore production or storage facility. Another possibility is that the hybrid pipeline can serve as a water or chemical injection line to the well.

In each of the different pipelaying methods referred to above, the or each of the first and/or second-mentioned connections can be made by a pipe connector comprising a main body having a welded connection to the rigid pipe section and an end flange for connection to a flexible pipe section. Such a connector can be made to have a simple and lightweight construction, especially since a welded connection is a very simple, relatively lightweight, effective and inexpensive connection expedient to the rigid pipe section, which in practice would be a steel pipe, and therefore suitable for welding, and also since an end flange can be readily attached to the end of a flexible pipe section, such as by providing a corresponding end flange on the end of the flexible pipe section and securing the two flanges together, such as by bolting.

Preferably, the or each connection between the or each raised end of the rigid pipe section and the respective flexible pipe section receives auxiliary support from auxiliary supporting means on a flex lay vessel used for the deployment of the or each flexible pipe section, when the one end of the or each flexible pipe section is lowered to the seabed with the respective raised end of the rigid pipe section attached, to return the latter to the seabed. The use of such auxiliary load bearing means ensures that the rigid pipe section is adequately supported at all times, without risk of damage to the or either flexible pipe section. Expediently, the auxiliary supporting means is an A & R winch and winchline on the flex lay vessel, which are typically provided anyway for other operational reasons.

Conveniently, the welded connection can be made at the sea surface during step (i), when most of the rigid pipe section has been lowered down to the seabed, prior to lowering the remaining end section of the rigid pipe section onto the sea bed.

For a better understanding of the invention and to show how the same can be carried into effect, reference will now be made, by way of example, to the accompanying drawings, in which:—

FIG. 1 very diagrammatically shows an installed hybrid pipeline extending from a manifold/Xmas tree to a floating production-storage offloading facility (FPSO);

FIG. 2 very diagrammatically shows an installed hybrid pipeline, also connecting a manifold/Xmas tree to a floating production-storage offloading facility (FPSO), where the installation has been effected using a pipe laying method according to one preferred implementation of the invention;

FIG. 3 is a longitudinal sectional view through a rigid-to-flexible connector (RFC), taken along section III-III in FIG. 3*b*, which connector is provided at each end of the rigid pipe section of the hybrid riser;

FIG. 3*a* is an underside view of the RFC as viewed along the line IIIa-IIIa in FIG. 3*b*;

FIG. 3*b* is an end view of the RFC connector shown in FIGS. 3 and 3*a*;

FIG. 4 is a side view of a flex lay vessel used for laying flexible pipe;

FIG. 5 is a side view showing the RFC on the seabed, as pre-installed by a rigid lay vessel;

FIG. 6 illustrates the pre-laid pipe end being recovered towards the flex lay vessel;

FIG. 15 shows near-completion of RFC deployment, the RFC now being landed on the seabed and the vessel starting to lay flexible pipe away from the RFC along the seabed;

FIG. 16 is an enlarged view of the RFC shown in FIG. 13, landed on the seabed; and FIG. 17 shows the flex lay vessel in the standard flex lay mode deploying the remainder of flexible pipe, after the A&R wire has been disconnected.

In the various Figures, like reference numerals denote corresponding elements.

Figure 1:
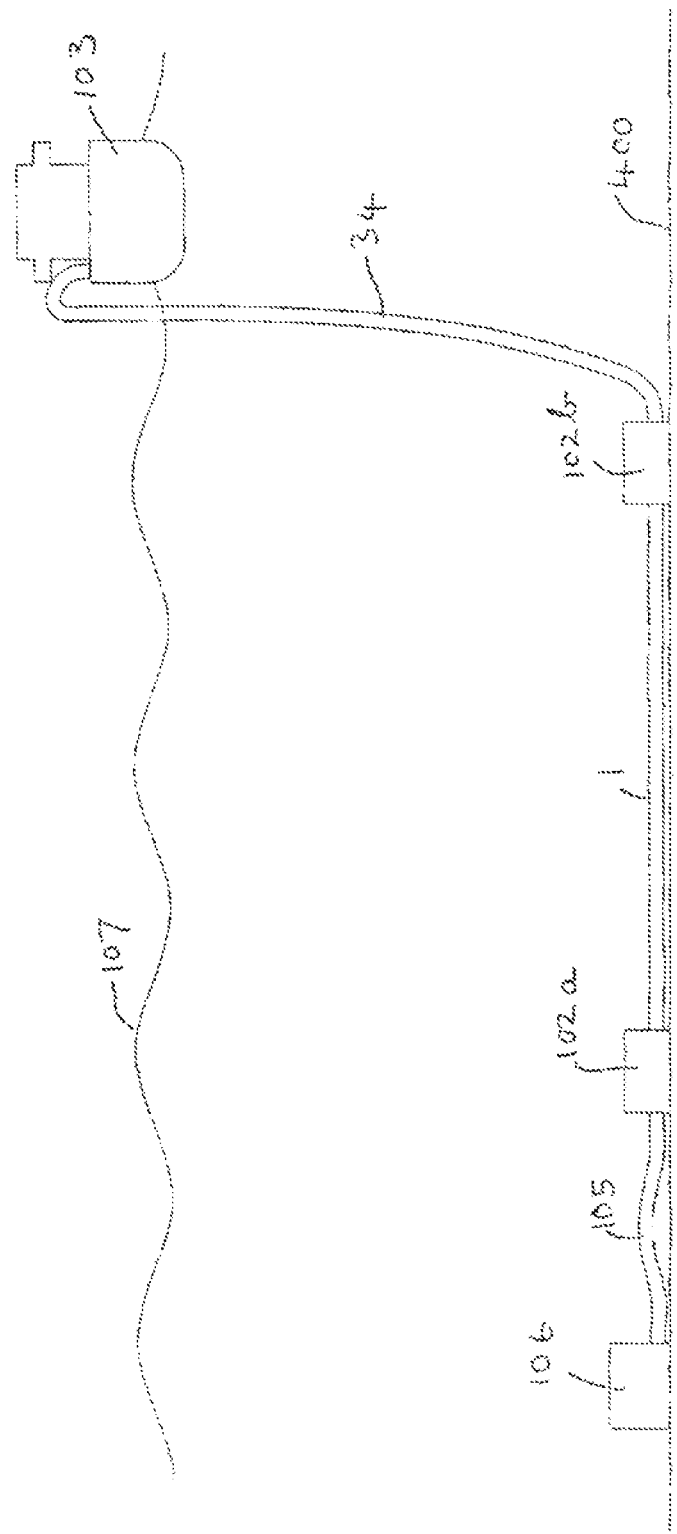

FIG. 1 shows a hybrid pipeline that has been laid to connect the manifold/Xmas tree to the FPSO 103 floating at the surface 107 of the sea, using the conventional installation methods described above. As already explained, this method suffers from the disadvantage that it uses conventional PLETs for effecting the required subsea connections, which are bulky, costly and time-consuming to manufacture and inspect.

Figure 2:
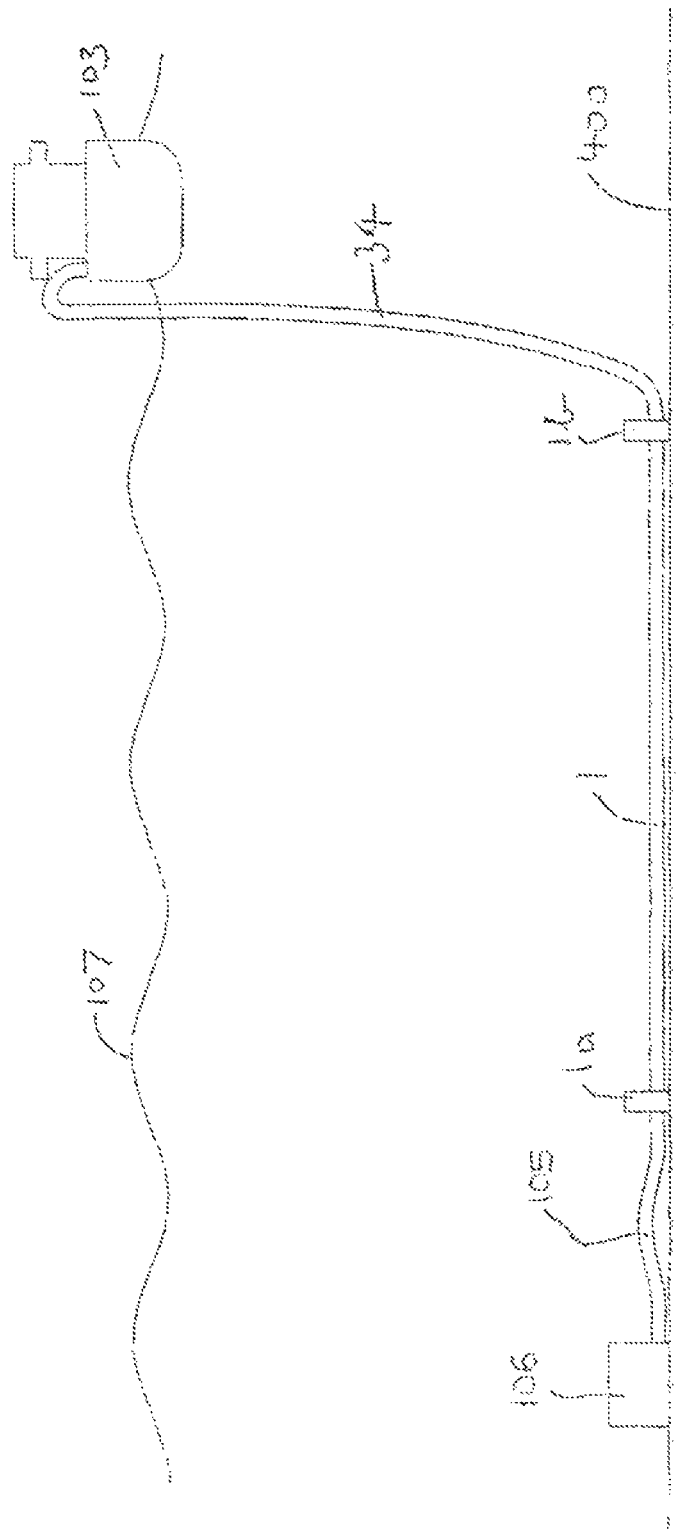

FIG. 2 very diagrammatically illustrates a preferred implementation of the pipe laying method in accordance with the present invention. In this method, a rigid lay vessel (not shown) arrives on site and lays a rigid pipe section 1, generally made of steel, on the seabed 108, complete with rigid-to-flexible end connectors (RFCs) 1a, 1b at its ends, in the same manner as the rigid pipe section with end PLETs was laid in the known method described with reference to FIG. 1. As will be described in more detail hereinbelow, the rigid pipe section may also be optionally provided with a pig launcher/receiver, not shown in FIG. 2, used for commissioning the rigid pipe section once it has been installed on the seabed with its end PLETs. The rigid lay vessel then departs the site.

A flex lay vessel (not shown), which has arrived on site, is used to recover one end of the rigid flowline 1, with the RFC 1a or 1b, to the flex lay vessel, but with most of the rigid flowline left on the sea bed. It is assumed, for the purpose of description, that RFC 1a is recovered first, but it could instead be the RFC 1b that is recovered first. One end of a flexible jumper 105 is connected to the RFC 1a and the flex lay vessel is used to lay the flexible jumper on the seabed, starting with its other end, which is positioned adjacent the subsea wellhead. The jumper and manifold/Xmas tree are now connected together subsea, using an ROV or a diver.

The flex lay vessel is then used to recover the other end of the rigid flowline 1, with the RFC 1b, to the flex lay vessel, again leaving most of the flowline on the sea bed. One end of a flexible pipe section or riser 104 is connected to the RFC 1b and the flex lay vessel is used to deploy the flexible riser to the seabed, bringing the RFC 1b back to its original position on the seabed. The flex lay vessel hands over the flexible pipe 34 to an FPSO 103, which has arrived on site, and the flex lay vessel departs to travel to its next pipelaying assignment. The flexible pipe is connected to the production or storage facilities of the FPSO.

Since the RFCs 1a, 1b are separately recovered to the attendant flex lay vessel, the necessary connections to the flexible jumper and flexible riser are not performed subsea, which allows considerably greater flexibility for the manner in which the RFC 1a is connected to the flexible jumper and the RFC 1b is connected to the flexible riser 34. In particular, since the connections are formed on board the flex lay vessel, it is possible to use conventional mechanical connection techniques. By contrast, subsea connections require specially designed connectors that can be manipulated subsea, which are typically of bulkier construction. Accordingly, the construction, weight and cost of each RFC are significantly less than those for a subsea PLET.

Furthermore, since the connections are made on board the flex lay vessel after the vessel has been anchored to the seabed, there is no risk of either RFC being damaged by the anchor of the flexible lay vessel. Accordingly, the RFCs do not need to be provided with anchor guards.

Still further, since the weight of each RFC is lower than that of the subsea PLET that would otherwise need to be used, each connector does not have to be provided with a mud mat, least only a smaller mud mat with a lesser contact area is required. Accordingly, a smaller and cheaper RFC is needed than the PLET which has conventionally been used instead.

Further details of the method of laying the hybrid pipeline and the equipment used for performing the method are given with reference to FIGS. 3 to 17. These Figures relate to the recovery of each RFC to the flex lay vessel, the connection of the flexible pipe to the RFC, the deployment of the flexible pipe to return the RFC to the seabed, and completion of the installation.

Referring to FIGS. 3, 3a and 3b, the rigid-to-flexible connector (RFC) at each end of the rigid pipe section 1 is of identical construction, although the description which follows applies specifically to the RFC 1b, it applies equally to RFC 1a.

RFC 1b comprises a main body made up from a short length of pipe 2, forging 3, another short length of pipe 4 similar to pipe length 2, and forging 5, which are all welded together. Alternatively, components 3, 4 and 5 could be fabricated as a unitary forging, welded to pipe 2.

The short length of pipe (known in the industry as a "pup piece") is generally made up from the same pipe material as the section of rigid pipe 1. Forging 3 includes an annular lip 9, which functions to support the rigid pipe catenary in conjunction with a hang off clamp on the flex lay vessel. Forging 5 includes an end flange 11, which is suitable for connecting to the end of the flexible pipe section or riser (not shown in FIGS. 3, 3a and 3b), which has an end fitted with a similar flange.

A collar 7, which is made up of two halves connected together using bolts 13, surrounds the pipe 4 and carries shackles 6 for the attachment of lifting rigging. This collar is axially constrained by the lip 9 on the forging 3 and an annular lip 10 on the forging 5, and transmits the load applied to the shackles 6 to the RFC 1b and rigid pipe The main body of the RFC 1b, made up from components 2, 3, 4 and 5 and the shackles 6, is pre-assembled, and the RFC is connected to the end of the rigid pipe 1 at 12 by welding. This connection is made on the rigid lay vessel after the rigid pipe section has been mostly laid on the sea bed, prior to laying down the final length of the rigid pipe on the sea floor, using an abandonment and recovery (A & R) winch line of an A & R winch 28.

A thermal insulation coating 8 covers the outside of most of the short pipe length 2 and of part of forging 3. Rigid pipe section 1 has a similar external insulating coating. Once the weld 12 has been made to join the rigid pipe section 1 and RFC 1b, the area of bare pipe on the rigid pipe section and RFC at the joint is fitted with a similar insulation (known in the industry as a "field joint coating system"—not shown), in order to maintain the heat transfer properties along the pipeline length.

Referring now to FIG. 4, there is shown a flex lay vessel, denoted generally by reference numeral 300, has a lower deck 23 used to accommodate a number of reels 200 for the storage of flexible pipe. Flexible pipe is guided from a selected reel on the lower deck to tensioners 21 on the upper deck 24. The tensioners are used to support the weight of the pipe as it is deployed into the sea over the stern of the vessel via an overboarding sheave 25, which is free to rotate.

The wire from the abandonment and recovery (A & R) winch 28 is passed through a sheave 27 suspended from an A-Frame 26 at the stern of the vessel. The abandonment and recovery winch is used to lower end sections of pipe to the sea floor and recover end sections of pipe from the sea floor. The A-frame is hingedly mounted on the vessel and can be 'boomed out' over the stern of the vessel using hydraulic rams 108.

The lower deck also accommodates a tugger winch 29 to aid the handling of items on the lower deck. The vessel is fitted with a number of auxiliary cranes 22 for the handling of most items and a main crane 129 for handling and deploying large items.

FIG. 5 shows one end of the rigid pipe section 1, with its RFC 1b, on the seabed 400, as pre-installed by the rigid lay vessel. An optional pig launcher and receiver unit (PLR) 30 is bolted to the RFC flange 11. Instead of PLR 30, an optional pig receiver (PR), for one-way pigging, may be bolted to RFC flange 11. The PLR (or PR) is used during the commissioning of the rigid pipe section after it has been laid prior to the arrival of the flex lay vessel.

A diver or ROV is used to attach A & R winch rigging or wire 32 from the flex lay vessel to a sling 31 which was installed with the rigid pipe section and its RFCs 1a, 1b. The sling may be fitted with a buoy 33 to hold the sling off the seabed 400, aiding attachment of the A & R winch rigging.

FIG. 6 illustrates the pre-laid rigid pipe end, with RFC 1b and PLR 30, being recovered to the flex lay vessel 300 by paying in on the A & R winch 28. The A & R winch rigging 32 is passed from the winch 28 over the sheave 27 on the A frame 28 and down to the PLR 30. The A & R winch draws in the rigid pipe end until the RFC 1b reaches a hang-off clamp 200 provided on the flex lay vessel.

Figure 7A:
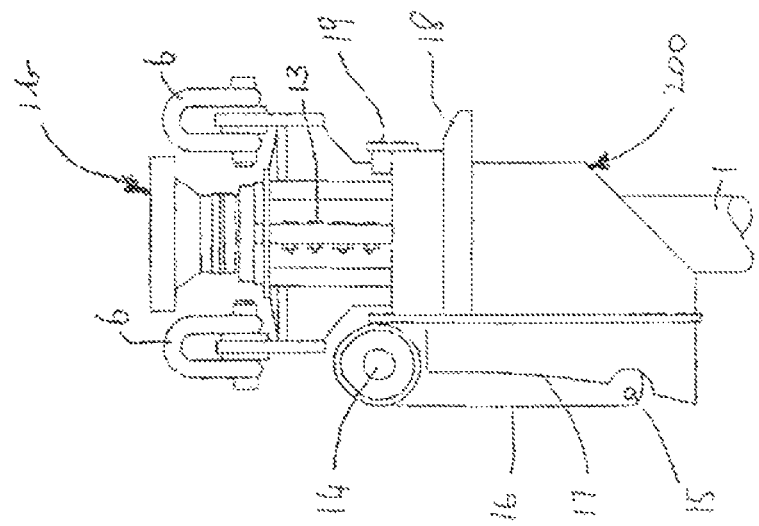
FIG. 7a is a side view of the RFC connector and hang-off clamp as seen from the right in FIG. 4.
Figure 7:
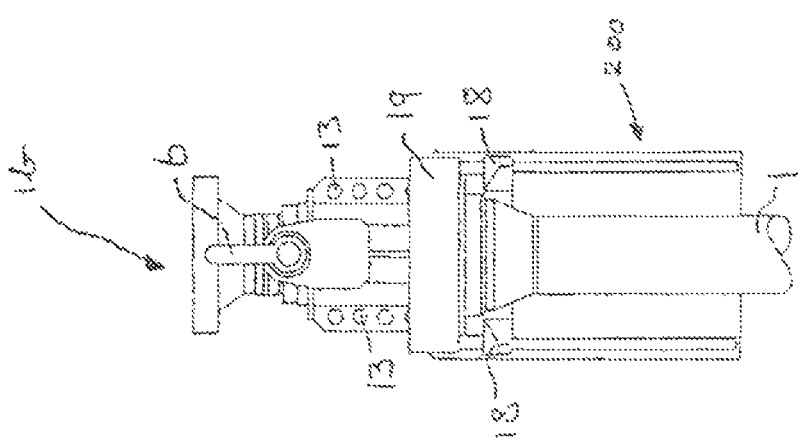
FIG. 7 is a side elevational view showing the RFC carried by a hang off clamp, which is provided at the stern of the flex lay vessel.

FIGS. 7 and 7a show the hang-off clamp, denoted by reference numeral 200, on the rigid lay vessel, used for supporting the RFC 1b.

The hang off clamp 200 is held closely against the overboarding sheave 25 of the flex lay vessel 300. This is achieved by attaching shackles to fixing holes 14 and 15 in the hang off clamp and using an arrangement of rigging and a winch. When the rigging is pulled tight by the tugger winch 29, the rear faces of a clamp 17 are shaped to sit against a curved groove in the overboarding sheave 25, with a straight part 16 of the hang off clamp sitting directly in the sheave groove, to ensure the clamp is aligned to the overboarding sheave 25.

The hang off clamp 200 is used to support the RFC 1b by allowing the retaining lip 9 to rest against pipe supports 18 on the hang off clamp. Once the RFC 1b has been inserted into the hang off clamp, a removable plate 19 is bolted into position to hold the RFC 1b in place.

Figure 8:
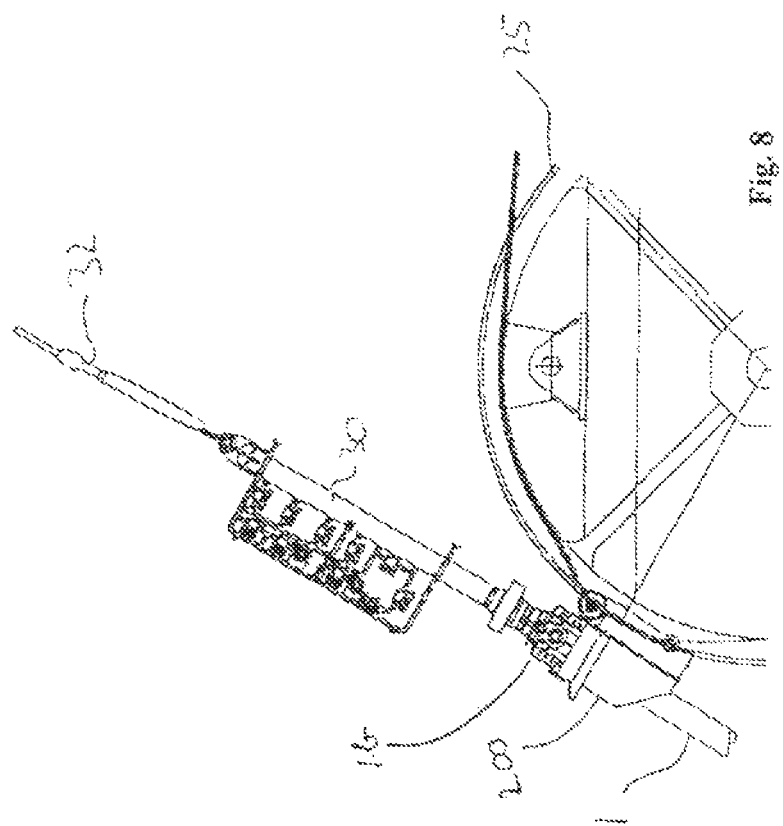
FIG. 8 is a detailed view showing the pipe end fully recovered to the flex lay vessel, resting within the hang-off clamp.

FIG. 8 shows the rigid pipe end and RFC 1b recovered to the flex lay vessel 300 and resting within the hang-off clamp 200 installed on the over-boarding sheave 25. The PLR 30 (or PR) is then removed from the pipe end by unbolting it from the flange 11 of the RFC 1b, leaving the RFC 1b supported in the hang off clamp 25 (FIGS. 2 and 9).

Figure 9:
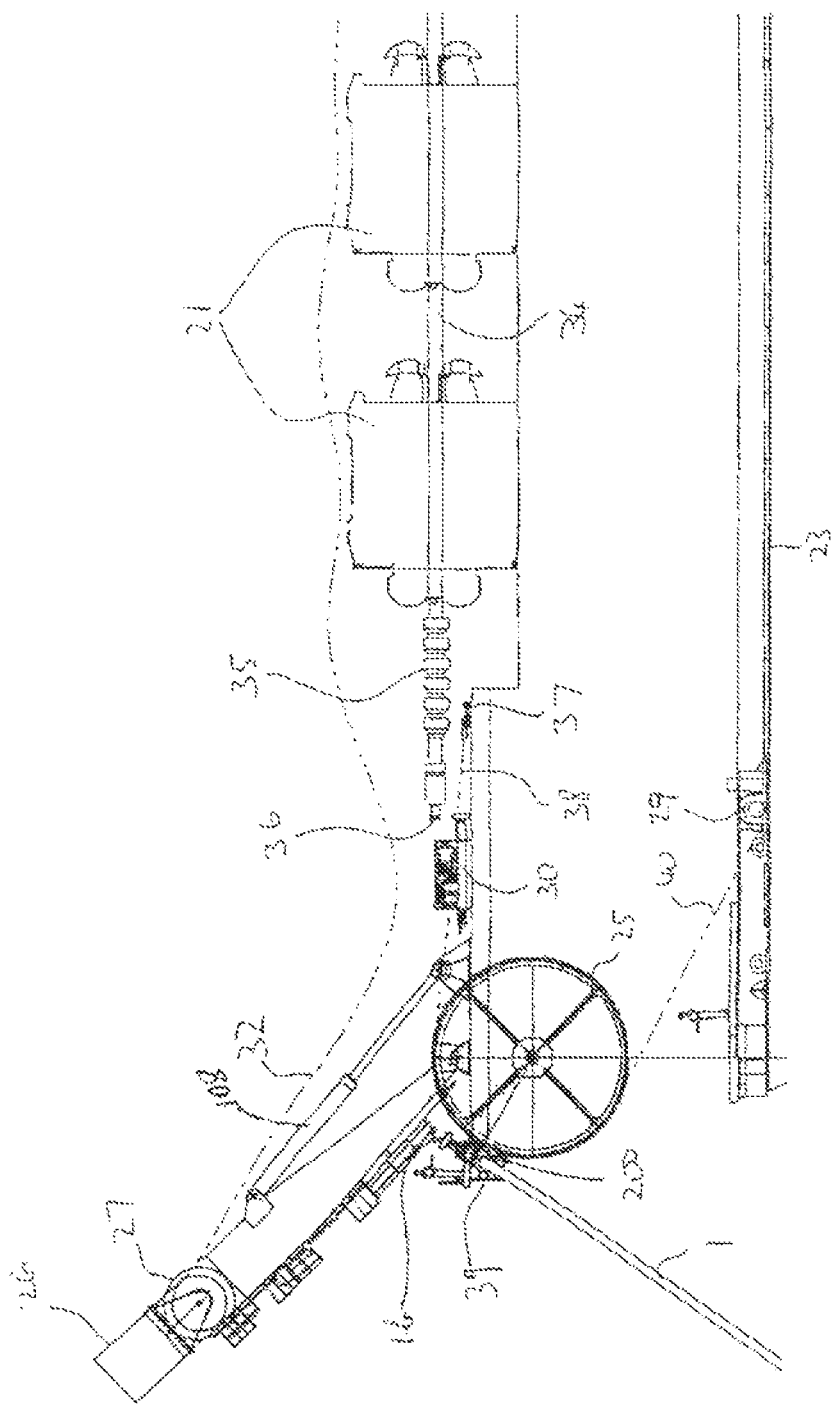
FIG. 9 illustrates the next stage of operation, after removal of an optional pig launcher/receiver (PLR), shown in FIG. 5, or pig receiver (PR), from the rigid pipe end.

FIG. 9 shows the rigging arrangement used to hold the hang off clamp 200 in place on the sheave 25. A wire of fixed length 38 is attached at one end to the upper deck 24 by means of a shackle 37. The opposite end of this wire 38 is attached to the upper shackle hole 14 in the hang off clamp 200. A further wire 40 is passed from the tugger winch 29 to the lower shackle hole 15 in the hang off clamp. The hang off clamp 200 is held tightly against the over-boarding sheave 25, by paying in on the tugger winch 29.

In order to gain access to the RFC 1b, a temporary work platform is constructed using scaffolding 39, erected when the flex lay vessel is being set-up.

Also shown in FIG. 9 is the flexible pipe 34, which has been advanced through the tensioners 21 and fitted with a bend stiffener 35 and a flanged end termination 36, similar to that on the forging 5 of the RFC 1b. Flexible pipes have a minimum radius of curvature and would be damaged if the radius were to be reduced below that value. The bend stiffener 35 prevents the portion of flexible pipe it is fitted to from being bent further than its allowable curvature.

After the rigid pipe end has been recovered to the flex lay vessel 300 with the RFC 1b resting within the hang-off clamp 200, the A & R winch wire 32 is allowed to go slack. This facilitates removal of the PLR 30 from the RFC. The PLR 30 is appropriately supported during disconnection, and then lifted clear using either an auxiliary crane 22 or the main crane 129.

Figure 10:
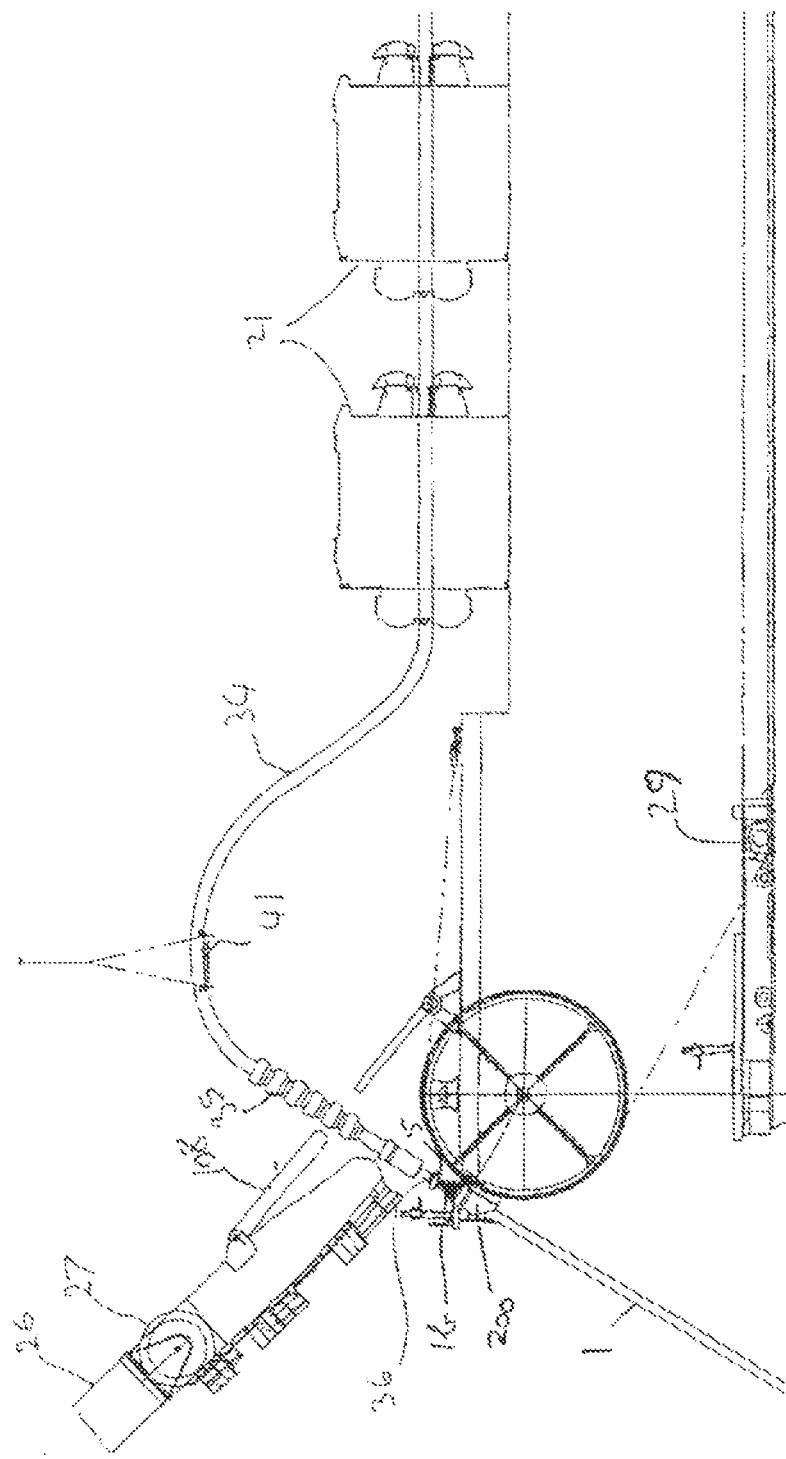
FIG. 10 shows a bolted connection being made up, on the flex lay vessel, between a flanged end termination on the flexible pipe section and the RFC on the end of the rigid steel pipe to provide a hybrid pipe.

With reference to FIG. 10, the length of flexible pipe 34 is advanced by the tensioners 21, to enable the bolted connection to be made up between the flanged end termination 36 on the flexible pipe 34 and the forging 5 of the RFC 1b on the end of the rigid steel pipe 1. The angle at which the flexible pipe 34 meets the rigid pipe is controlled by raising and lowering a roller box 41, which is suspended from the main crane 129. Not shown in FIG. 10 is a chain block or similar means used to pull the two pipe ends together prior to attachment by bolting. The bend stiffener 35 serves to prevent damage to the flexible pipe 34 as its end termination 36 is being manipulated into alignment with the RFC 1b on the end of the rigid pipe 1, as well as during deployment of the RFC 1b with connected end termination 36, such deployment being described below with reference to FIG. 13.

The A & R wire 32 is connected to the shackles 6 on the RFC 1b, ready for the re-deployment of the raised rigid pipe end on the seabed and the deployment of the flexible pipe from the flex lay vessel 300.

The temporary scaffold 39 needs to be dismantled and the clamp removable plate 19 removed, before the operation to dislodge the RFC 100 from the hang off clamp 200 can be started in preparation for re-deployment of the joined rigid and flexible pipes.

Figure 11:
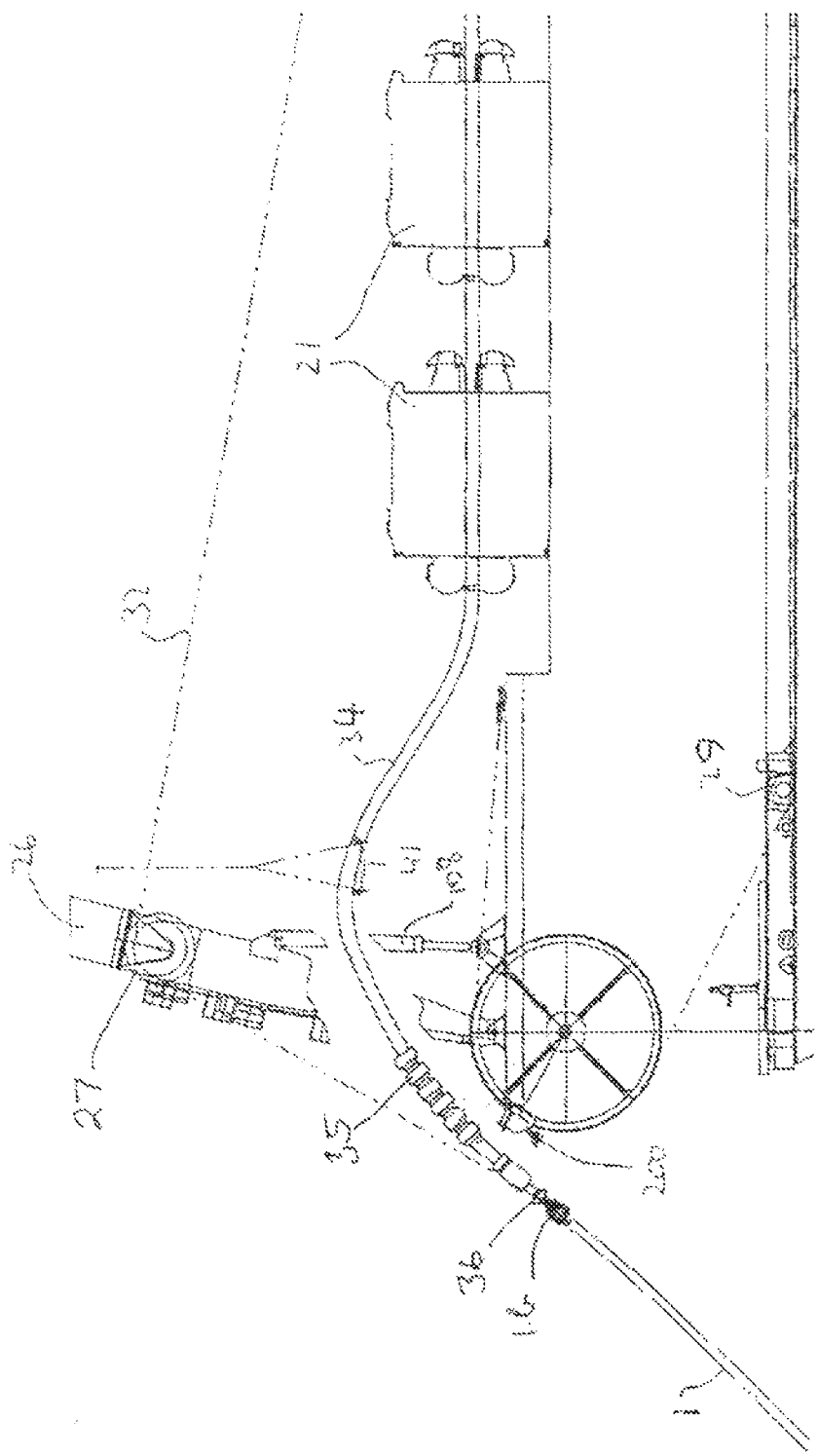
FIG. 11 illustrates an operation that is performed to dislodge the RFC from the hang-off clamp in preparation for deployment of the hybrid pipe.

The pipe assembly consisting of rigid pipe 1, flexible pipe 34, and RFC 1b is then lifted clear of the hang off clamp 200 by paying in on the A & R winch wire 32 and adjusting the angle of the A frame 26, as shown in FIG. 11. The flexible pipe is supported by the main crane 129 and roller box 41, but the operation and the amount of flexible pipe 34 paid out is altered to suit by advancing or returning flexible pipe through the tensioners 21.

Once the pipe assembly is lifted clear of the hang off clamp 200, the hang off clamp is dismantled by paying out on the tugger winch 27 and then supporting it with an auxiliary crane 22, prior to removing the shackles and then lifting it clear with the auxiliary crane.

Figure 12:
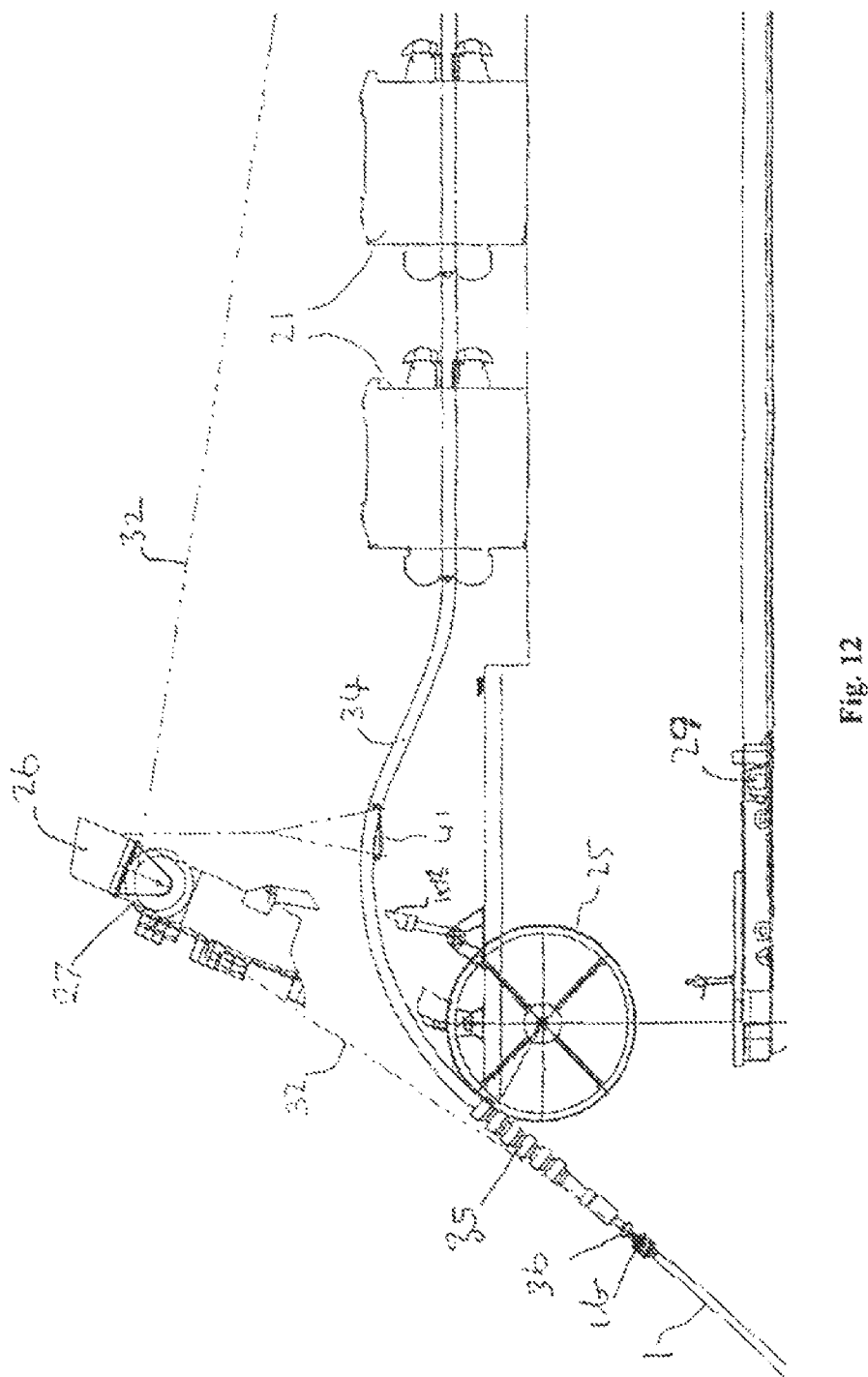
FIG. 12 illustrates the next stage of deployment, in which the pipe assembly is lowered, allowing the flexible pipe to pass over the overboarding sheave.

FIG. 12 shows the next stage of the deployment, by which the A & R wire 32 is paid out to lower the pipe assembly, allowing the flexible pipe 34 to pass over the freely rotating overboarding sheave 25.

Since the flexible pipe is not strong enough to support the weight of the rigid pipe 1 at the required lay angle and lay wheel radius, the rigid pipe is supported at all times, as it travels through the sea water down to the sea bed, by the A & R winch 32 attached to the RFC 1b. The radius of curvature of the flexible pipe approaching the over-boarding sheave 25 is maintained, as the pipe assembly is lowered, by gradually lowering the height of the roller box 41 by paying out on the main crane 129, until the roller box is no longer necessary for supporting the flexible pipe.

Figure 13:
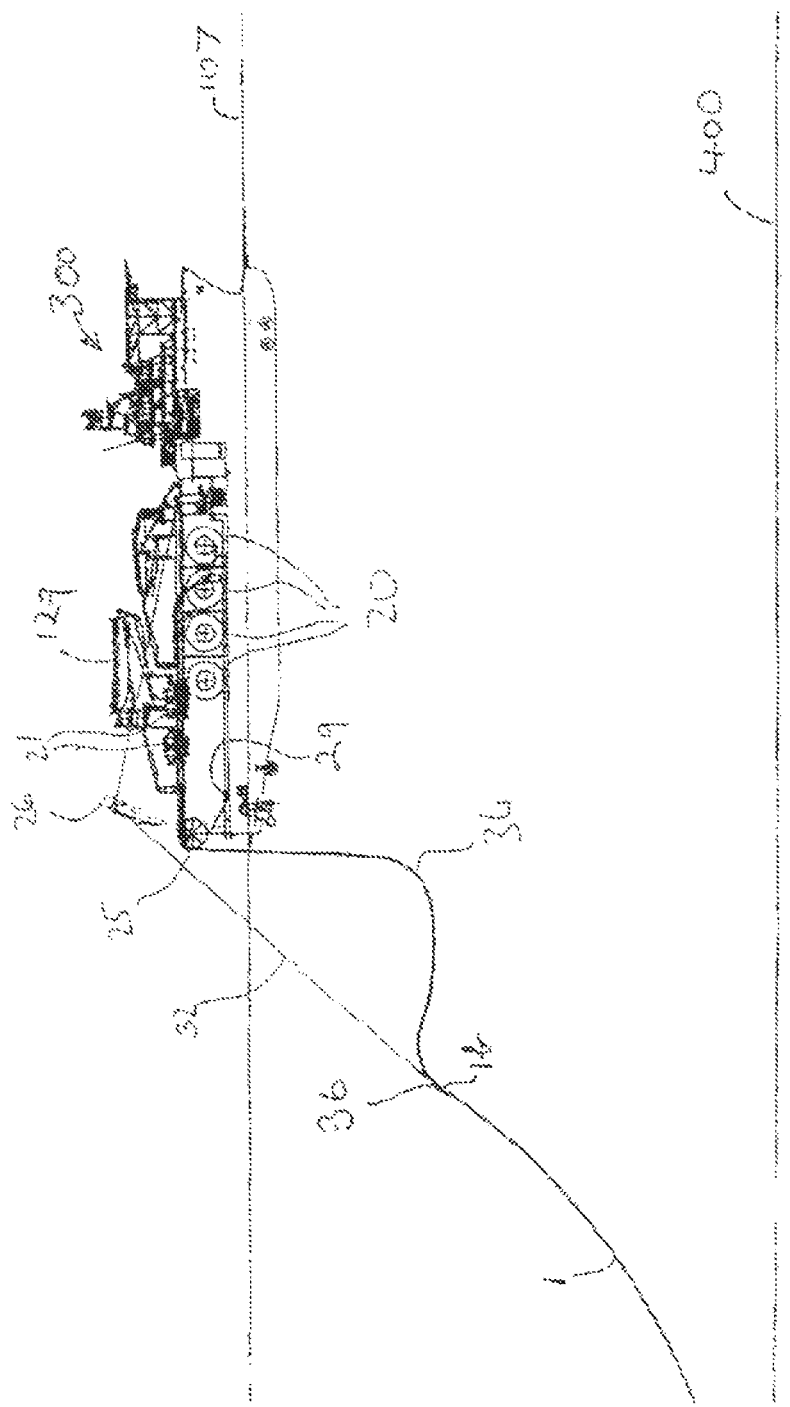
FIG. 13 shows the deployment, with the RFC now at midwater depth.

FIG. 13 shows the deployment of RFC 1b with assembled end termination 36 at a mid-water depth, the rigid pipe 1 supported by the A & R wire 32 and the flexible pipe deployed from the storage reel over the overboarding sheave 25 by advancing the tensioners 21. The inclination of the A frame 26 is adjusted to prevent the A & R wire 32 from clashing with the flexible pipe 34 as it passes over the overboarding sheave 25.

Figure 14:
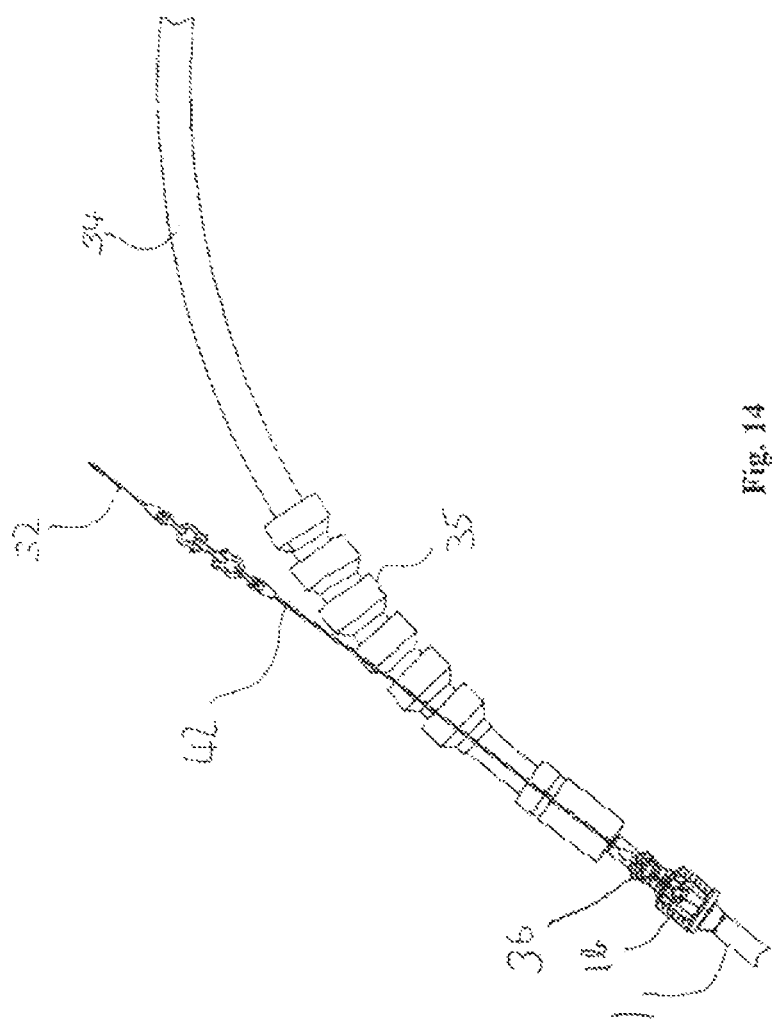
FIG. 14 is an enlarged side view of the RFC at the midwater depth shown in FIG. 13.

FIG. 14 is a detailed view of the RFC 1b at a mid-water depth as shown in FIG. 13. It will be noted that the A & R wire 32 is attached to the RFC 1b by means of a yoke 42 which shares the load between the two shackles 6.

FIG. 15 shows the final stage of RFC deployment, in which the RFC 1b has landed on the seabed 400 and the flex lay vessel 300 has started to lay flexible pipe away from the RFC 1b along the seabed. At this stage, the yoke 42 is disconnected from the RFC 1b by diver or ROV, allowing the A & R wire 32 to be recovered to the vessel 300 by paying in on the A & R winch 28.

FIG. 16 is a detailed view of FIG. 15, showing the RFC 1b landed on the seabed 400 prior to disconnection of the A & R wire.

After the A & R wire 32 has been disconnected from the RFC 1b, the flex lay vessel 300 continues in regular flex lay mode, deploying the remainder of the flexible pipe 34 as normal (FIG. 17).

When the flexible pipe is to be used as a flexible riser for connection to an FPSO, the flex lay vessel will cease flex lay when the pre-selected length of flexible pipe pre-wound onto the storage reel for the particular job in hand has been drawn off. The pipe end termination on the end of the flexible pipe is then handed over to the FPSO for final connection.

Alternatively, the flexible pipe may be required to link the rigid pipe on the seabed to a remote onshore storage or production facility, or the like, for example where the rigid pipe section is located in relatively deep water and the seabed topography in shallower water requires the use of flexible pipe. In such circumstances, the flex lay vessel would continue laying the flexible pipe as shown in FIG. 17 over the required distance on the seabed.

The description given above relates to the deployment of the flexible pipe section or riser that is subsequently connected up to the FPSO facility. Essentially the same method is used for deploying the flexible jumper, with the following differences. Once the pre-selected flexible pipe jumper length has been deployed, with one end on the seabed and the other end still on the attendant flex lay vessel, the A & R winch line is attached to the end connector on the jumper and the winch line is reeled out to lower the remainder of the flexible jumper and end of the rigid pipe section all the way to the seabed. An ROV or diver can then attach the connector at the other end of the flexible jumper to the manifold/Xmas tree at the wellhead.

The attachment and deployment of the flexible jumper connected to one end of the rigid pipe section and the attachment and deployment of the flexible pipe section attached to the other end of the rigid pipe section can be carried out in either order. It is possible, but not preferred, to carry out both operations simultaneously, since this would require the use of two flex lay vessels at the same time.

Although the rigid lay vessel used in the laying method disclosed with reference to the drawings is a reel lay vessel, in appropriate circumstances a J-lay or S-lay vessel of the kind referred to above may be used instead.

EXAMPLE

A comparison has been made of the relative costs, manufacturing time, inspection costs related to the manufacture and maximum sea state for installation of a hybrid pipeline having a principal rigid pipe section on the seabed, a flexible jumper connection the manifold/Xmas tree at the wellhead to one end of the rigid pipe section and a flexible pipe section connecting the other end of the rigid pipe section to an FPSO floating on the sea surface, the stated cost and time parameters being estimated when using PLET connectors as is known in the art and actual when using RFC connectors according to the proposals disclosed hereinabove, with the following results:

|  | PLET connectors | RFC connectors |
| --- | --- | --- |
| Manufacturing costs | 12 PLETs costing US$400k each, total cost = US$4.8M | 13 RFCs (12 needed + 1 spare) costing US$100k each, total cost = US$1.3M |
| Manufacturing time | 12 PLETS could take up to 2.5 years to manufacture | 13 RFCs took 8 months to manufacture |
| Inspection costs for quality control | Could be as high as US$3M for the 12 PLETS | Close to US$200k for the 13 RFCs |
| Maximum sea roughness state for installation | 2.5 metre wave height significant | 2.0 metre wave height significant for RFC assembly & 2.2 metre wave height significant for RFC abandonment |

[In the above table, k=1,000 and M=1,000,000]

From the above table, it can immediately be seen that the RPC option gives considerable manufacturing cost advantages over the PLET option (US$1.3M versus US$4.8M), a very significant reduction in manufacturing time, despite having to recover each end of the rigid pipe section in turn to the surface to attach the flexible jumper and flexible pipe section as the case may be, and then re-lay them on the seabed (2.5 years reduced to 8 months), and much lower inspection costs during manufacture (US$200k as opposed to US$3M), with the marginal penalty that the maximum sea roughness (wave height) that can be tolerated for installation in view of safety considerations is 2.0 meter waves as opposed to 2.5 meter waves. The savings are very significant indeed in terms of cost and time considerations when carrying out the installation of a hybrid pipeline, whereas the penalty is marginal and will not apply under most operational situations.

The invention claimed is:

1. A method of laying a hybrid pipeline comprising a rigid pipe section that lies on the seabed and a flexible jumper which is connected to the rigid pipe section, comprising the steps of:
(i) lowering a rigid pipe section onto the seabed,
(ii) raising one end of the rigid pipe section on the seabed to the surface of the sea, while leaving a portion of the rigid pipe section on the seabed,
(iii) connecting one end of a flexible jumper to the raised end of the rigid pipe section so that the flexible jumper and the rigid pipe section are in fluid communication, and
(iv) lowering the one end of the flexible jumper to the seabed with the raised one end of the rigid pipe section attached, to return the raised one end of the rigid pipe section to the seabed and to lay the flexible jumper on the seabed,
wherein a connection between the raised one end of the rigid pipe section and the flexible jumper receives auxiliary support from an abandonment and recovery winch and winch line on a flexible lay vessel used for deployment of the flexible jumper, when the one end of the or each flexible jumper is lowered to the seabed with the respective raised one end of the rigid pipe section attached, to return the raised one end of the rigid pipe section to the seabed and thereby maintaining a sufficient bending radius in the flexible jumper greater than a minimum bend radius of the flexible jumper.

2. The method according to claim 1, wherein the other end of the flexible jumper is connected to a manifold or Christmas tree at a wellhead of a subsea well, after the flexible jumper has been laid on the seabed.

3. The method according to claim 1, wherein a connection between the rigid pipe section and the flexible jumper is made by a pipe connector comprising a main body having a welded connection to the rigid pipe section and an end flange for connection to a flexible jumper.

4. The method according to claim 3, wherein the pipe connector is located on the seabed in steps (i) and (iv) without one or more of a mudmat and an anchor guard.

5. The method according to claim 3, wherein the welded connection is made at the sea surface during step (i), when most of the rigid pipe section has been lowered down to the seabed, prior to lowering a remaining end section of the rigid pipe section onto the sea bed.

6. The method as claimed in claim 1, wherein steps (ii) to (iv) are repeated to connect a second flexible jumper to a second end of the rigid pipe section so that the second flexible jumper and the rigid pipe section are in fluid communication.

7. The method according to claim 1, wherein the rigid pipe section is provided with a pigging unit before lowering on to the seabed in step (i), and wherein the pigging unit is removed in connecting the flexible jumper to the rigid pipe section.

8. The method according to claim 1, wherein step (i) is performed by the rigid lay vessel, and wherein steps (ii), (iii) and (iv) are performed by a flexible lay vessel.

9. The method according to claim 8, wherein a hang off clamp is provided on the flexible lay vessel to support the raised one end of the rigid pipe section for connection to the flexible jumper.

10. The method according to claim 9, wherein the hang off clamp is fixed to an overboarding sheave of the flexible lay vessel, and the overboarding sheave is prevented from rotating freely during the connecting of the flexible jumper to the rigid pipe section in step (iii).

11. The method according to claim 9, wherein for step (iii), the flexible jumper is supported by a roller box to control an angle of connection of the flexible jumper to the rigid pipe section.

12. The method according to claim 11, wherein for step (iv), a height of the roller box is adjusted to enable support of the flexible jumper at a chosen lay angle.

13. The method according to claim 2, wherein a connection between the rigid pipe section and a flexible jumper is made by a pipe connector comprising a main body having a welded connection to the rigid pipe section and an end flange for connection to a flexible jumper.

14. The method according to claim 4, wherein the welded connection is made at the sea surface during step (i), when most of the rigid pipe section has been lowered down to the seabed, prior to lowering a remaining end section of the rigid pipe section onto the seabed.

15. The method as claimed in claim 5, wherein steps (ii) to (iv) are repeated to connect a second flexible jumper to a second end of the rigid pipe section so that the second flexible jumper and the rigid pipe section are in fluid communication.

16. The method according to claim 6, wherein the rigid pipe section is provided with a pigging unit before lowering on to the seabed in step (i), and wherein the pigging unit is removed in connecting the flexible jumper to the rigid pipe section.

17. The method according to claim 7, wherein step (i) is performed by a rigid lay vessel, and wherein steps (ii), (iii) and (iv) are performed by a flexible lay vessel.

18. The method according to claim 1, wherein a hang off clamp is provided on the flexible lay vessel to support the raised one end of the rigid pipe section for connection to the flexible jumper.

19. The method according to claim 10, wherein for step (iii), the flexible jumper is supported by a roller box to control an angle of connection of the flexible jumper to the rigid pipe section.

* * * * *